(12) United States Patent
Netzer et al.

(10) Patent No.: US 8,583,482 B2
(45) Date of Patent: Nov. 12, 2013

(54) AUTOMATED MONITORING AND VERIFICATION OF INTERNET BASED ADVERTISING

(75) Inventors: Oren Netzer, Wyckoff, NJ (US); Alex Liverant, Givatayim (IL)

(73) Assignee: Double Verify Inc., New York, NY (US)

( * ) Notice: Subject to any disclaimer, the term of this patent is extended or adjusted under 35 U.S.C. 154(b) by 319 days.

(21) Appl. No.: 13/000,346

(22) PCT Filed: Jun. 23, 2009

(86) PCT No.: PCT/IL2009/000622
§ 371 (c)(1),
(2), (4) Date: Dec. 20, 2010

(87) PCT Pub. No.: WO2009/156988
PCT Pub. Date: Dec. 30, 2009

(65) Prior Publication Data
US 2011/0125587 A1    May 26, 2011

Related U.S. Application Data

(60) Provisional application No. 61/074,677, filed on Jun. 23, 2008.

(51) Int. Cl.
*G06Q 30/00* (2012.01)
(52) U.S. Cl.
USPC ............ 705/14.4; 705/14.43; 705/14.73
(58) Field of Classification Search
None
See application file for complete search history.

(56) References Cited

U.S. PATENT DOCUMENTS

2002/0032740 A1*  3/2002  Stern et al. ............... 709/206
2002/0078444 A1*  6/2002  Krewin et al. ............ 725/35

(Continued)

FOREIGN PATENT DOCUMENTS

JP    2001167029 A    6/2001
JP    2004062318 A    2/2003

OTHER PUBLICATIONS

Heydon A; Najork M: "Mercator: A scalable, extensible Web crawler" World Wide Web, Baltzer Science Publishers, Bussum, NL, vol. 2, No. 4, Dec. 1, 1999, pp. 219-229, XP002409315.

(Continued)

*Primary Examiner* — Matthew T Sittner
(74) *Attorney, Agent, or Firm* — Marsteller & Associates, P.C.

(57) ABSTRACT

Method for automatically monitoring and verifying advertising content during a campaign, delivered over a data network. Accordingly, one or more advertisers submit, via a user interface, a list (that may be generated manually or by the mapping crawlers) of sites or of sections per site, on which the advertising content should be placed according to a desired insertion order (the insertion order information may modified at any time point). In addition, one or more mapping crawlers are activated to visit these sites and locate pages with advertisements that belong to required sections, pages that do not belong to the required sections or pages with high probability for incidents. A list of pages to visit per every site is generated and autonomous or Plug-in visual crawlers are allowed to visit the list of pages, according to a predetermined site visiting plan. A crawlers' manager allocates the pages between visual crawlers, for obtaining required adequate incident coverage and load on the visual crawlers. An incident identifier compares the insertion orders with the delivery data and whenever an insertion order and its corresponding delivery data do not match, an incident report is generated.

19 Claims, 9 Drawing Sheets

(56) References Cited

U.S. PATENT DOCUMENTS

| | | | |
|---|---|---|---|
| 2004/0024632 A1* | 2/2004 | Perry | 705/10 |
| 2004/0205049 A1* | 10/2004 | Aggarwal | 707/3 |
| 2005/0149396 A1* | 7/2005 | Horowitz et al. | 705/14 |
| 2005/0267872 A1* | 12/2005 | Galai et al. | 707/3 |
| 2006/0136528 A1* | 6/2006 | Martin et al. | 707/205 |
| 2006/0229899 A1* | 10/2006 | Hyder et al. | 705/1 |
| 2006/0293957 A1* | 12/2006 | Petersen et al. | 705/14 |
| 2007/0078835 A1* | 4/2007 | Donnelli | 707/3 |
| 2007/0233565 A1* | 10/2007 | Herzog et al. | 705/14 |
| 2007/0244750 A1* | 10/2007 | Grannan et al. | 705/14 |
| 2007/0245249 A1* | 10/2007 | Weisberg | 715/758 |
| 2007/0250390 A1* | 10/2007 | Lee et al. | 705/14 |
| 2008/0004958 A1* | 1/2008 | Ralph et al. | 705/14 |
| 2008/0059288 A1* | 3/2008 | Kokernak | 705/10 |
| 2008/0109300 A1* | 5/2008 | Bason | 705/14 |
| 2008/0147487 A1* | 6/2008 | Hirshberg | 705/10 |
| 2008/0189267 A1* | 8/2008 | Spivack et al. | 707/5 |
| 2008/0201731 A1* | 8/2008 | Howcroft | 725/13 |
| 2008/0271070 A1* | 10/2008 | Kanojia et al. | 725/32 |
| 2008/0287150 A1* | 11/2008 | Jiang et al. | 455/466 |
| 2009/0089742 A1* | 4/2009 | Nagulu et al. | 717/106 |
| 2009/0119268 A1* | 5/2009 | Bandaru et al. | 707/3 |
| 2009/0156190 A1* | 6/2009 | Fisher | 455/418 |
| 2009/0222316 A1* | 9/2009 | Boinepalli et al. | 705/10 |

OTHER PUBLICATIONS

International Preliminary Report on Patentability (IPRP) CH II mailed Sep. 28, 2010 for parent PCT application, serial No. PCT/IL2009/000622.

Hideki Tanaka & Tetsuji Soda, Practical guide to online advertising, Jan. 24, 2001, extract from Internet Advertising Practices, ISBN 4-569-61285-7, PHP Institute, 2001, pp. 52-58.

* cited by examiner

```
┌─────────────────────────────────────┐
│ The advertiser submits the list of  │
│ sites on which the advertising is   │
│ to be placed, and the list of       │
│ sections per site if applicable,    │
│ and they are entered into the       │
│ system through the user Interface.  │
└─────────────────────────────────────┘
                  ↓
┌─────────────────────────────────────┐
│ The tracking pixel process is       │
│ activated for tracking actions in   │
│ which the advertiser places a tag   │
│ (a Javascript code, for example)    │
│ which explores the page to find     │
│ certain parameters and then         │
│ generates an image tag (with the    │
│ found parameters) representing a    │
│ pixel on the page that is displayed │
│ immediately after action are tracked.│
└─────────────────────────────────────┘
                  ↓
┌─────────────────────────────────────┐
│ The *mapping crawlers* are          │
│ instructed to visit the sites and   │
│ locate pages with advertisements    │
│ that belong to the required         │
│ sections, additional pages that do  │
│ not belong to the required          │
│ sections, as well as pages with     │
│ high probability for incidents. The │
│ *mapping crawlers* create a list of │
│ pages to visit per every site.      │
│ Alternatively, this stage can be    │
│ done manually by a human            │
└─────────────────────────────────────┘
                  ↓
┌─────────────────────────────────────┐
│ The *visual crawlers* are           │
│ instructed to visit the list of     │
│ pages of each site created before.  │
│ some of which are part of the       │
│ sections that are included in the   │
│ advertiser's buy, and some of which │
│ are part of sections that are       │
│ excluded from the buy. The crawlers │
│ are also instructed how many times  │
│ per day should each page be visited │
│ and the start and end date of the   │
│ campaign.                           │
└─────────────────────────────────────┘
                  ↓
┌─────────────────────────────────────┐
│ The *visual crawlers* begin their   │
│ crawling tasks, visiting numerous   │
│ pages per day for the duration of   │
│ the campaign. The *crawlers         │
│ manager* allocates the pages        │
│ between the various crawlers to     │
│ achieve adequate incident coverage  │
│ and load on the crawlers            │
└─────────────────────────────────────┘
```

AUTOMATED MONITORING AND VERIFICATION OF INTERNET BASED ADVERTISING

FIELD OF THE INVENTION

The present invention relates to a system and a method for automatic monitoring and verification of advertising content, delivered over a data network the world-wide-web and other forms of Internet-based media (media that is based on similar protocols as the Internet, generally referred to as digital media). This includes but is not limited to desktop internet, mobile phones and internet-protocol-based TV (IPTV).

BACKGROUND OF THE INVENTION

When a company buys advertising space or time from a media seller, it includes specific instructions in regards to where, when and how this advertising should be delivered. These instructions are compiled after extensive research using various different tools, and, from the advertising buyer's perspective, best reflects its advertising goals and represents the optimal use of its advertising budget. The cost of the advertising is also directly related to the type and extent of campaign delivery instructions.

These instructions may include the dates and time of day in which the advertising is to be launched or delivered, the number of times the advertisement should be delivered, the type of audience it should be delivered to the location of the advertising, the frequency in which it should be delivered and other various rules, policies and conventions which the advertising should adhere to. The order which the advertiser places with the media seller that contains these instructions and that is accepted by the media seller is usually referred to as an "Insertion Order" (IO). An insertion order usually consists of various placements with each placement representing a different insertion. The Insertion Order represents the written contract between the advertising buyer and the seller pertaining to this advertisement campaign.

The advertising seller delivers the advertisements to its website on the world-wide-web or other form of digital media using a computer program usually referred to as an ad server. Every web page that should display advertising contents has one or more ad server tags embedded within its code (in the background). This ad server tag is a piece of code that calls a remote advertising server that delivers the advertisements to the page. This ad tag sends information to the ad server about the page and about the user accessing this page. The ad server selects the appropriate ad to deliver from a large bank of advertisements by matching the most appropriate advertisement, based on the definitions of the insertion orders and placements, with the corresponding user and page based on the information passed to it by the website.

Because of the complexities of the insertion orders, the short timeframe usually available to set up the campaigns and because of other technological challenges, the actual delivery of the ads can frequently differ from the instructions specified in the insertion order. These inconsistencies can cost advertising buyers many millions of dollars of advertising budget wastage.

Another conventional way for monitoring is known as "Tracking Pixel" (TP—a method for tracking actions, according to which the advertiser places an image tag representing a pixel on the page that is displayed immediately after the action being tracked), which is an invisible point that can be used to identify the origin website. However, this way is very limited, since many inconsistencies (such as the location of the ad within the web-page, simultaneously displaying competitive advertisements on the same page, fraud display of an ad, covered by another ad etc.) may not be identified. Moreover, ads delivered within Inline Frames (IFrames—HTML documents embedded inside another HTML document on a website. The IFrame HTML element is often used to insert content from another source, such as an advertisement, into a Web page), and even nested IFrames, because of IFrames security definitions, do not disclose the URL of the site the ad was delivered to, thus not allowing to identify the visited URL from the conventional and standard data of the Tracking pixel. Again, this causes advertisers to lose money.

All the methods described above have not yet provided satisfactory solutions to the problem of providing a method and system for automatic monitoring and verification advertising content, delivered over a data network, such as the Internet.

It is an object of the present invention to provide a method and system for automatic monitoring and verification advertising content, delivered over a data network.

It is another object of the present invention to provide a method and system for automatically monitoring and verifying whether or not the advertising content optimally complies with the advertising Insertion Order defined by the advertiser.

It is another object of the present invention to provide a method and system for automatically monitoring and verifying whether or not the advertisement represents more optimal use of the advertising budget that corresponds to the Insertion Order defined by the advertiser It is a further object of the present invention to provide a method and system for automatically monitoring and verifying that the instructions specified in the insertion order matches the advertiser's intent.

Other objects and advantages of the invention will become apparent as the description proceeds.

SUMMARY OF THE INVENTION

The present invention is directed to a method for automatically monitoring and verifying advertising content during a campaign, delivered over a data network. Accordingly, one or more advertisers submit, via a user interface, a list (that may be generated manually or by the mapping crawlers) of sites or of sections per site, on which the advertising content should be placed according to a desired insertion order (the insertion order information may modified at any time point). The tracking pixel process is activated for tracking actions in which the advertiser places a tag (a Javascript code, for example) which explores the page to find certain parameters and then generates an image tag (with the found parameters) representing a pixel on the page that is displayed immediately after actions are tracked. In addition, one or more mapping crawlers are activated to visit these sites and locate pages with advertisements that belong to required sections, pages that do not belong to the required sections or pages with high probability for incidents. A list of pages to visit per every site (usually performed by a spider—i.e., by a program that visits websites and reads their pages and other information in order to create entries for a search engine index) is generated and one or more (autonomous or Plug-in) visual crawlers are allowed to visit the list of pages, according to a predetermined site visiting plan. A crawlers' manager allocates the pages between visual crawlers, for obtaining required adequate incident coverage and load on the visual crawlers. An incident identifier compares the insertion orders with the delivery data and whenever an insertion order and its corresponding delivery data do not match, an incident report is generated.

Some of the pages may be part of the sections that are included in, or excluded from, the advertiser's buy. The visiting plan may include information regarding how many times per day should each page be visited and the start and end date of the campaign.

The modification of the insertion order may take effect immediately, in a future date, or retroactively.

The advertiser may access the user interface at any point in time to view the incidents and update their status. The site managers may access the user interface to view the incidents that are happening on their site.

Advertisers may view reports about incidents that are happening on their site, via the user interface.

Preferably, the mapping crawlers are used to:
a) retrieve the html text from the web-page;
b) analyze the text and meta-data in the web-page, without any hierarchical manipulation of the objects in the page;
c) identify pages that contain advertisements by identifying ad server signatures in the page;
d) identify the number of advertisements in the page and the size of each ad;
e) identify the ad server key values and advertising categories that each page belongs to, for creating a map of site categories;
f) for each ad server, identify the specific site id, which identifies the site in front of the ad server. This is recorded for later use in the process of analyzing the TP data.
g) find pages that this page links to by analyzing the links in the page;
h) determine the length of the page and detect if any changes have been done to the page since the last analysis;
i) analyze redirection of pages;
j) report and record any errors in the page;
k) input user data if required by the site/page. User input data may include but not limited to: user clicks, login parameters, user information and any other user related data;
l) identify the ad servers route;
m) identify and create a map of sites belonging to ad networks and ad servers.
n) identify and create a map of sites belonging to a network of sites;
o) impersonation—using cookies, sessions (post/get), user agent the crawler can be identified as needed by the campaign (demographically, user parameters etc.).
p) identify information regarding the advertisements in the page (location, size, type, advertiser's website address, creative location, creative asset etc.)

The site map may include the number of times each page is linked and parameters representing the weight of the page.

Preferably, the visual crawlers are used to:
a) render a web-page graphically and generate a hierarchical representation of the page based on the html text of the page;
b) identify interstitials
c) identify media types that are displayed;
For each media type:
d) track down its landing page;
e) find its position on the page;
f) find its dimensions;
g) identify the ad servers route
h) identify site redirection
i) check if its html/JavaScript tag has certain signatures that define the media as an advertisement;
j) analyze the text and meta-data in the page to classify the page, the site and the associated ads;
k) input user data if required by the site/page. User input data may include but not limited to: login parameters, user information and any other user related data.

The media types may include Images, Flash animations, Streaming video or Text ads.

The visual crawler may employ Session Crawling, Cookie Crawling, Contextual Crawling or Classification Crawling. The crawlers' manager is used to:
a) intermediate and arbitrate between the data repository and the running Crawlers; and
b) retrieve sites or pages that needed to be crawled form the data repository and allocates them to different crawlers.

Advertisements may be any piece of media on the page, including: image, flash animation, text, streaming video.

Preferably, advertisements or advertisers are recognized according to HTML tags (like image), Flash tags, JavaScript, or Iframe that contains other ads inside.

Advertisements may be recognized by identifying all of the tags on the page that correspond to an ad server's signature and parsing the tag and extract information such as the URL of the creative file, the landing page, the type of ad, the size of the ad and the advertising category.

Incidents may be scored per incident type per page, per incident type per page category, per site or per incident type per site category.

Scoring may be done also by aggregation of all incident types.

Below the fold incident, ad clutter incident, ad fraud incident, ad hijacking incident or inappropriate content incident may be generated even without an IO.

The present invention is also directed to data processing system for extracting predefined content from multimedia networks, operatively associated with multimedia content, that comprises:
a) at least one mediator server comprising:
   a.1) at least one web crawler operatively associated with the mediator server;
   a.2) at least one visual content database operatively associated with the mediator server and comprising visual content associated with at least one advertiser,
wherein the mediator is arranged to receive instructions associated with an advertiser from the database and instruct at least one crawler to apply a visual content extraction process of predefined visual content over the multimedia network.

The data processing system may also be used for monitoring, verifying and auditing of multimedia network advertising, operatively associated with multimedia content. In this case, the data processing system may comprise:
a) at least one mediator;
b) at least one advertisement database operatively associated with the mediator server and comprising visual content associated with at least advertiser and corresponding advertising campaigns and extracted visual content from the multimedia network,
wherein the mediator is arranged to receive visual content associated with an advertiser and corresponding advertising campaigns from the database and apply a predefined monitoring, verifying and auditing process of an advertising campaign over the multimedia network in view of visual content placement on corresponding multimedia network;
and wherein the mediator is further arranged to provide a verification and monitoring report.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein:

FIGS. 5-9 are flowcharts showing the steps of the method according to some embodiments of the present invention.

DETAILED DESCRIPTION OF PREFERRED EMBODIMENTS

In the following detailed description, numerous specific details are set forth in order to provide a thorough understanding of the disclosure. However, it will be understood by those skilled in the art that the teachings of the present disclosure may be practiced without these specific details. In other instances, well-known methods, procedures, components and circuits have not been described in detail so as not to obscure the teachings of the present disclosure.

Figure 1:
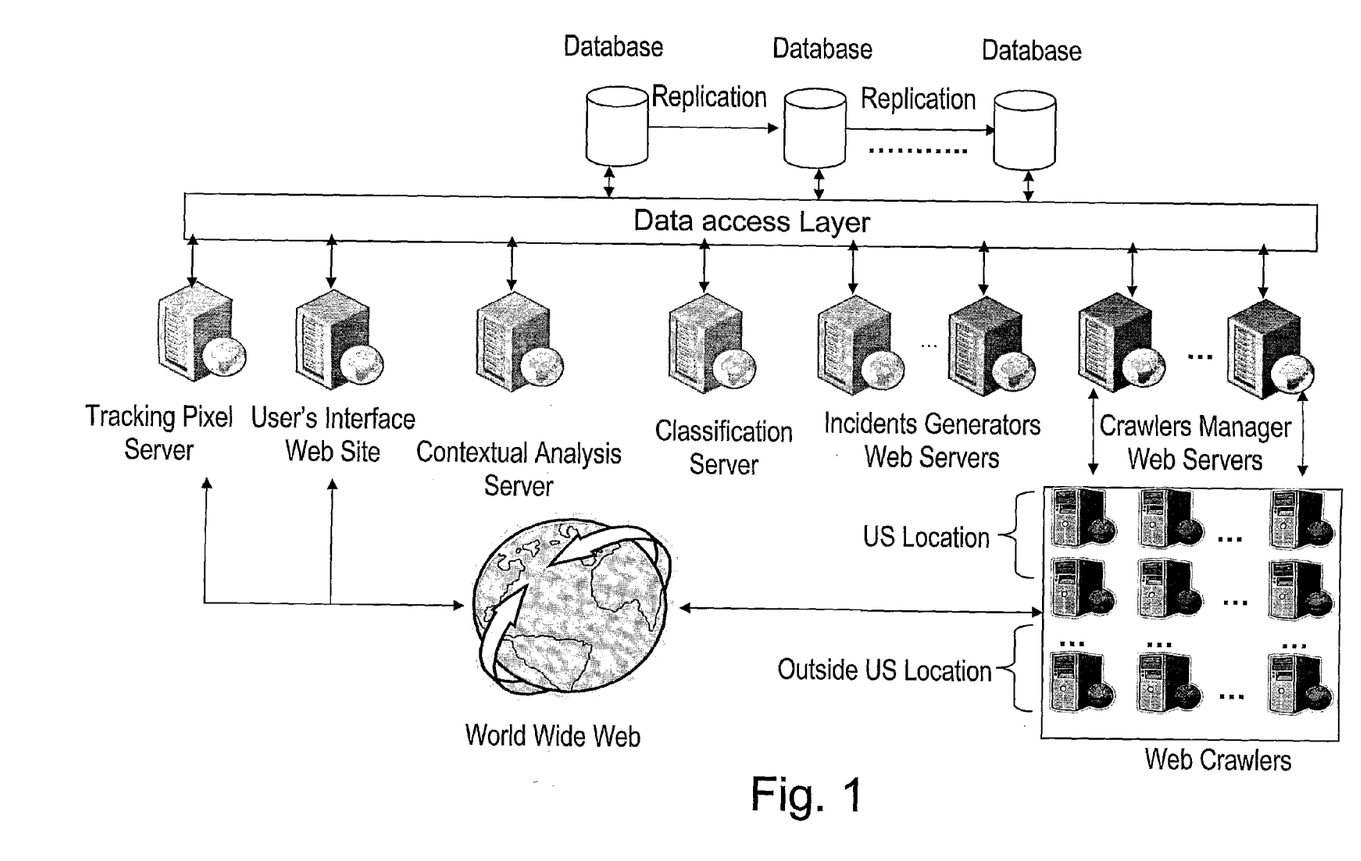
FIG. 1 is a schematic diagram showing the environment of operation of the present invention.

The present invention, in embodiments thereof discloses a system and method that is used to automatically monitor the actual delivery of the advertising campaign and to verify that the actual delivery of the advertising is consistent with the Insertion Order. Although the explanations and examples in this document refer in particular to advertising on the Internet, the same methods can be applied to other forms of advertising on any data network and digital mediums, such as advertising on mobile devices, IP-based television and broadcast media. The architecture of the system proposed by the present invention is shown in FIG. 1.

Figure 2:
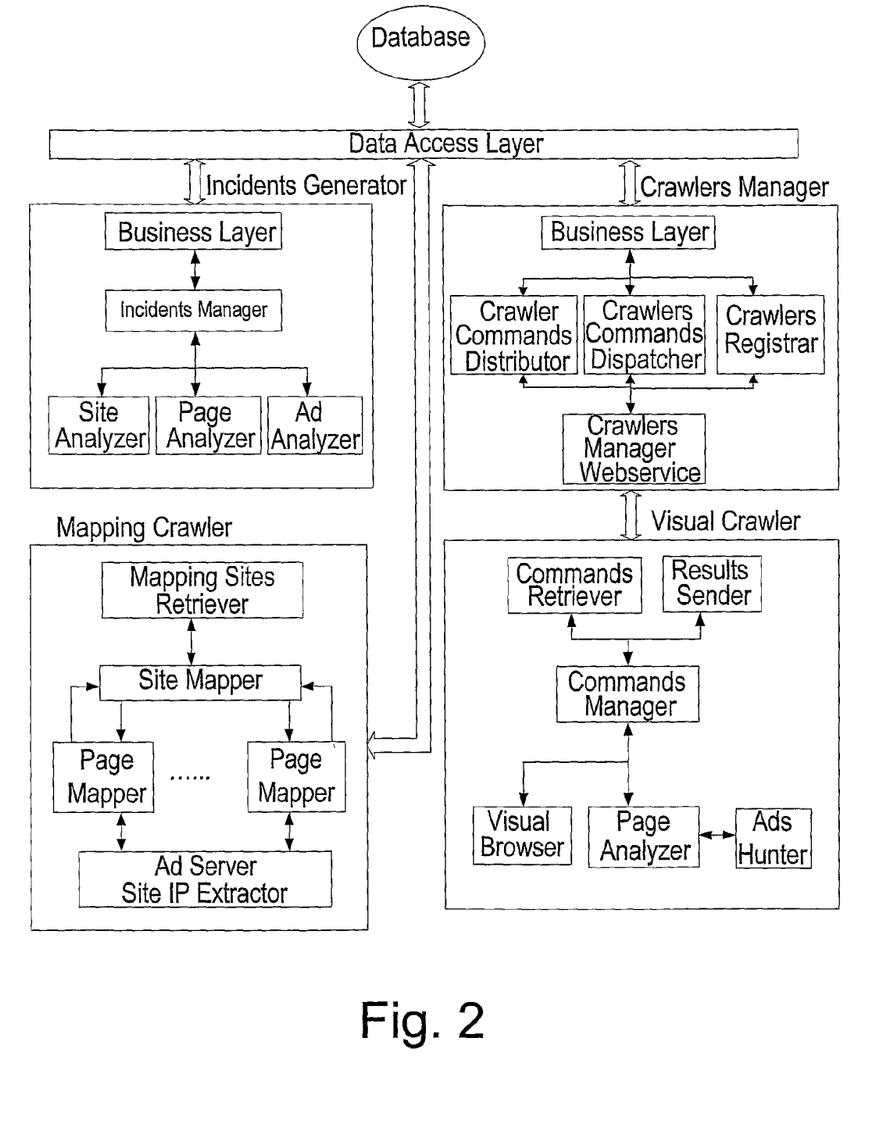
FIGS. 2-4 are schematic block diagrams of the data processing system according to some embodiments of the invention.
Figure 3:
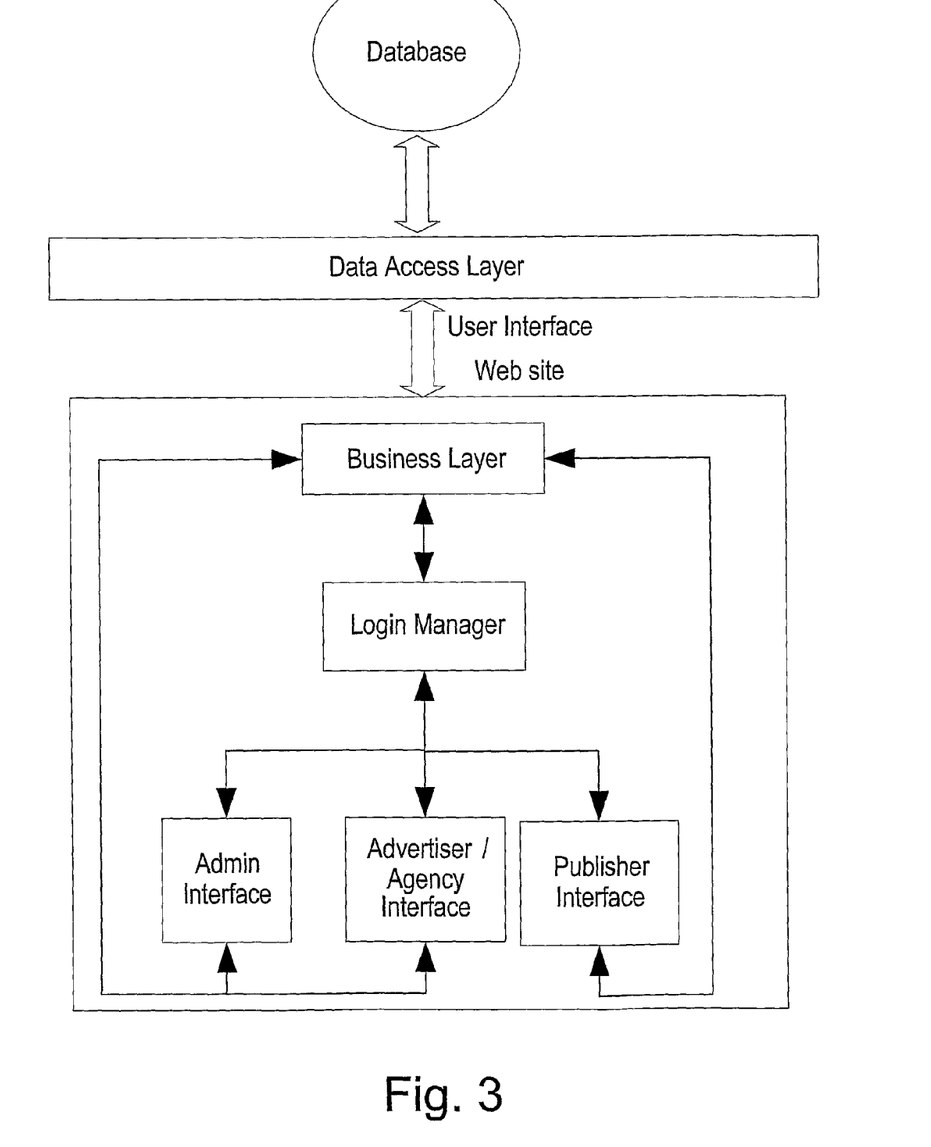
Figure 4:
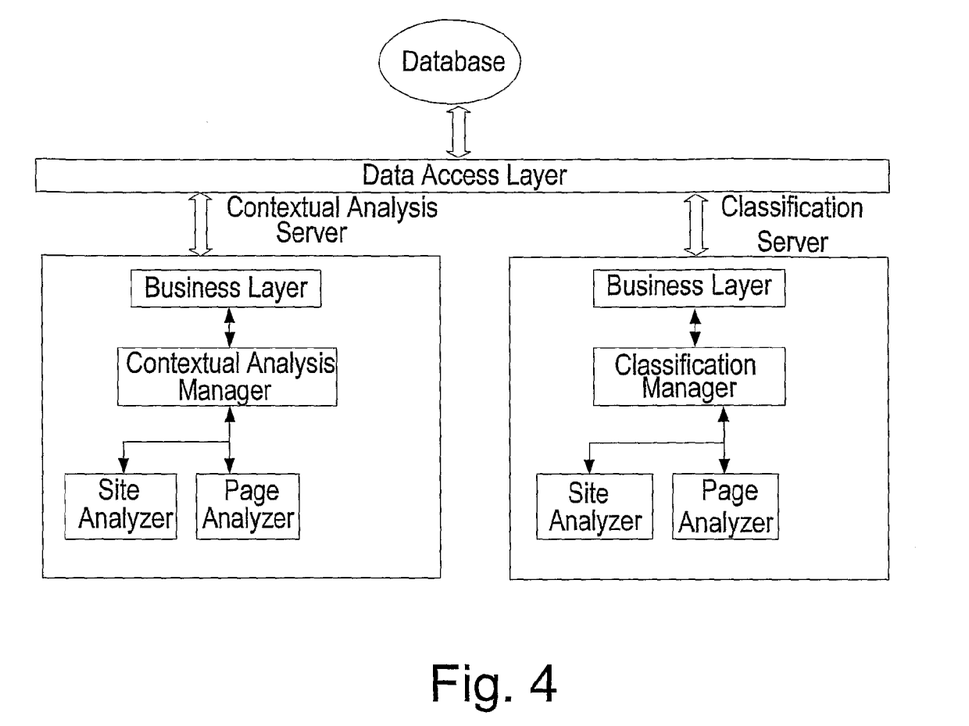
Figure 6:
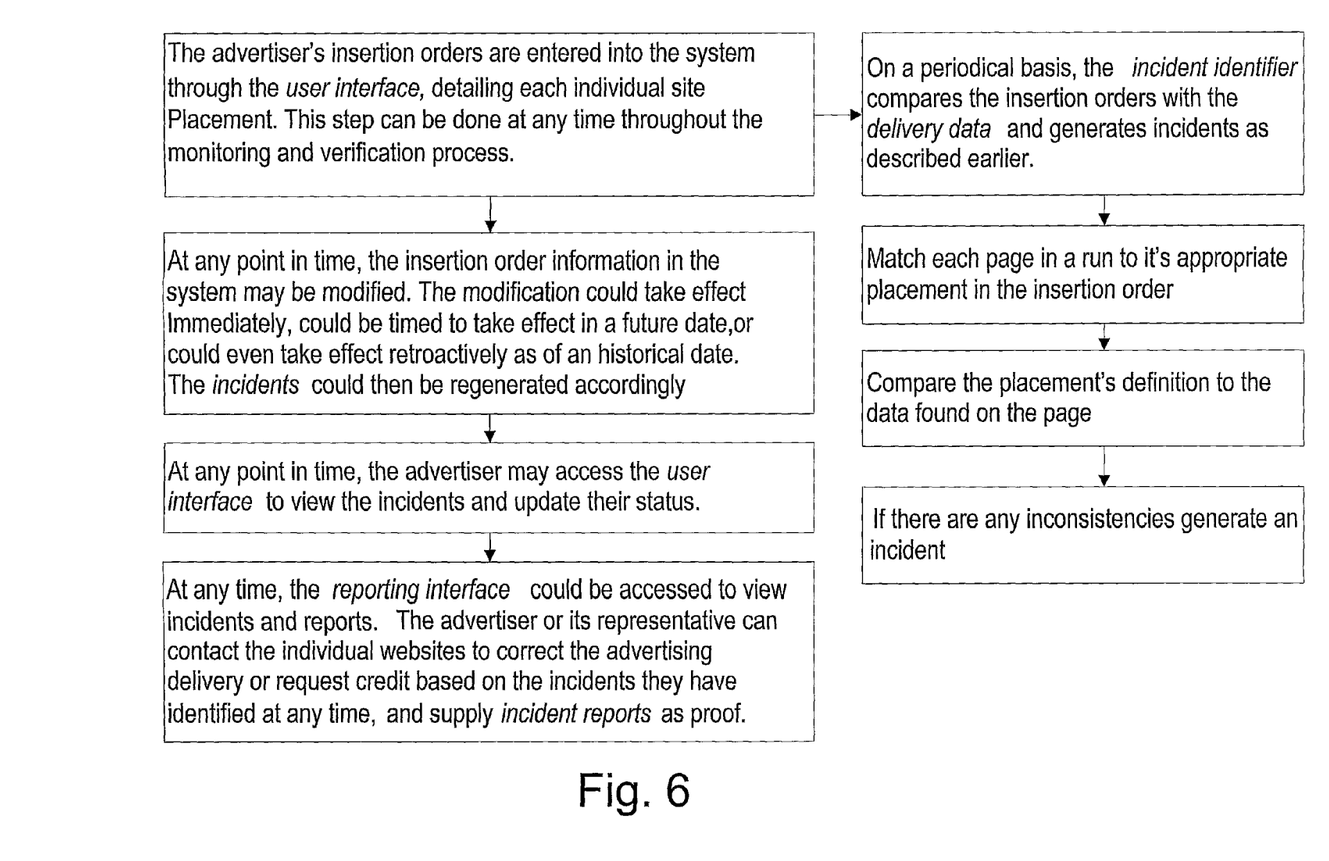

The system according to some embodiments of the invention comprises of the following parts, as shown in details in FIGS. 2-4.

DEFINITIONS

Visual Crawler—An automated computer program (the visual crawler) that can visit any website and individual web pages within the website and "render" the page—view a web page in the same manner a human being will view the web page. This program can also extract information on the page being viewed such as the URL of the page and other data and meta-data of the page, and can extract information regarding the advertisements in the page such as their location, size, type, advertiser's website address, creative location, creative asset and any other information that can be available through the page directly or indirectly, for example, verifying that there are no delivered ads in un-decent sites or sites that should not display the delivered ads. The program may also emulate a person who has interest in a specific subject and measure the reaction time. This computer program can then save all this information into a central data repository, such as a database or a log file. This data will be referred to as the delivery data since it describes the actual way in which the advertisements were delivered. This computer program also saves a visual image of the web page which can be used for verification purposes.

Mapping Crawler—An automated computer program (the mapping crawler) that can visit any website and individual web pages within it and extract and analyze the data and meta-data in the page, such as the URL of the page, information regarding the advertisements in the page (location, size, type, advertiser's website address, creative location, creative asset etc.) The mapping crawler may also emulate a person who has interest in a specific subject and measure the reaction time. Then all this information is stored in a central database or a log file. The mapping crawler can perform the following tasks:

- look for signatures of ad servers in the page to determine if this page contains advertisements;
- determine the advertising categories of the page;
- count the number of advertisements in the page and their sizes to check if the page has higher probability for certain types of incidents;
- find the URL address of all the web pages that this page links to and the number of occurrences;
- measure the "length" of the page to check if it has higher probability for certain types of incidents; analyze the data/text or meta-data in the page to look for certain predefined keywords that can allow us to classify this page;
- detect if any changes have been done to the page since its last analysis.

Crawlers Manager—An automated computer program (the crawlers manager) that arbitrates between the data repository that contains information regarding the pages that need to be crawled and between various visual crawlers or mapping crawlers. The crawlers manager assigns page crawling tasks to each of the crawlers based on parameters such as but not limited to the geographic location of each crawler, number of pages to crawl, the sites that need to be crawled, the type of operating systems and browsers that need to be simulated.

User Interface—A user interface that allows users to enter Insertion Order information into the system, review and manage incidents. Users are required to enter the agreed terms of the advertising campaign (insertion orders and placements) into the system, so that they can be compared to the actual delivery. This information includes the delivery terms agreed with the media seller as described previously and will be referred to as the terms and conditions. The incidents can later be viewed and their status can be tracked.

Incident Identifier—An automated computer program (the Incident Identifier) that compares between the actual delivery data that was collected by the crawler by the tracking pixel, and from the panel and between the terms and conditions received from each advertiser, and identifies any cases in which the actual delivery was different from what was specified in the terms and conditions. In each case in which delivery was found to be different, the Incident Identifier would generate an incident report. There can be many incident types, depending on the type of inconsistency that occurred. When an incident report is generated, it may include a timestamp, the address of the website and web page on which the incident was identified and other relevant information pertaining to the page, as well as relevant information pertaining to the terms and conditions of this particular placement. The incident report also includes an image of the advertiser's ad, along with an image of the webpage with the actual incident as it occurred and as was recorded by the crawler as a way to prove the occurrence of the incident.

Reporting Interface—A reporting interface that allows searching and viewing for incident reports as well as searching, viewing and analyzing aggregated and statistical information on incidents.

Ad Server—An ad server is a web server that stores advertisements used in online marketing and delivers them to website visitors and uploading ads according to predetermined rules. Ad servers may count the number of clicks for an ad campaign and generate reports. Whenever a reference to an ad server is made, it is also referring to ad networks and ad exchange services.

Site—whenever a reference to a site is made, it is also referring to site networks.

Panel—a panel of users about whom there is already information (e.g., demographic, socioeconomic, geographic background etc.). These users may have a crawler plug-in, which is not adapted to crawl but rather to analyze the pages that the users visit.

System Architecture

FIG. 1 shows an architectural diagram of the various parts of the invention. Some of the below servers may be implemented as one single server.

The following is a description of the monitoring and verification process:

The advertiser submits the list of sites on which the advertising is to be placed, and the list of sections per site if applicable, and they are entered into the system through the user interface.

A queue generator creates a list of pages to visit by the mapping crawlers and the visual crawlers. This queue includes pages that are specified in the IO as well as pages outside of the IO. The queue will also include pages to crawl where incidents have already been detected either from the crawler or from the tracking pixel as well as pages with high probability for incidents. The queue could be ordered according to priorities of campaigns, sites and incidents related data.

The mapping crawlers are instructed to visit the sites and locate pages with advertisements that belong to the required sections, additional pages that do not belong to the required sections. Alternatively, this stage can be done manually.

The visual crawlers are instructed to visit the list of pages of each site created in step 2, some of which are part of the sections that are included in the advertiser's buy, and some of which are part of sections that are excluded from the buy. The crawlers are also instructed how many times per day should each page be visited and the start and end date of the campaign.

The visual crawlers begin their crawling tasks, visiting numerous pages per clay for the duration of the campaign. The crawlers' manager allocates the pages between the various crawlers to achieve required adequate incident coverage and load on the crawlers.

The advertiser's insertion orders are entered into the system through the user interface, detailing each individual site placement. This step can be done at any time throughout the monitoring and verification process. Data collected by the tracking pixel process, by the panel, and by the crawlers is combined to generate delivery data of the advertising content to predetermined sites. On a periodical basis, the incident identifier compares the insertion orders with the delivery data and generates incidents as described earlier.

At any point in time, the insertion order information in the system may be modified. The modification could take effect immediately, could be timed to take effect in a future date, or could even take effect retroactively as of an historical date. The incidents could then be regenerated accordingly.

At any point in time, the advertiser may access the user interface to view the incidents and update their status.

An optional step is to allow the sites to access the user interface to view the incidents that are happening on their site.

At any time, the reporting interface could be accessed to view incident's and reports. The advertiser or its representative can contact the individual websites to correct the advertising delivery or request credit based on the incidents they have identified at any time, and supply incident reports as proof.

Mapping Crawler

The mapping crawlers retrieve the html text from the web page and analyze the text and meta-data in the page, without any hierarchical manipulation of the objects in the page.

Figure 7:
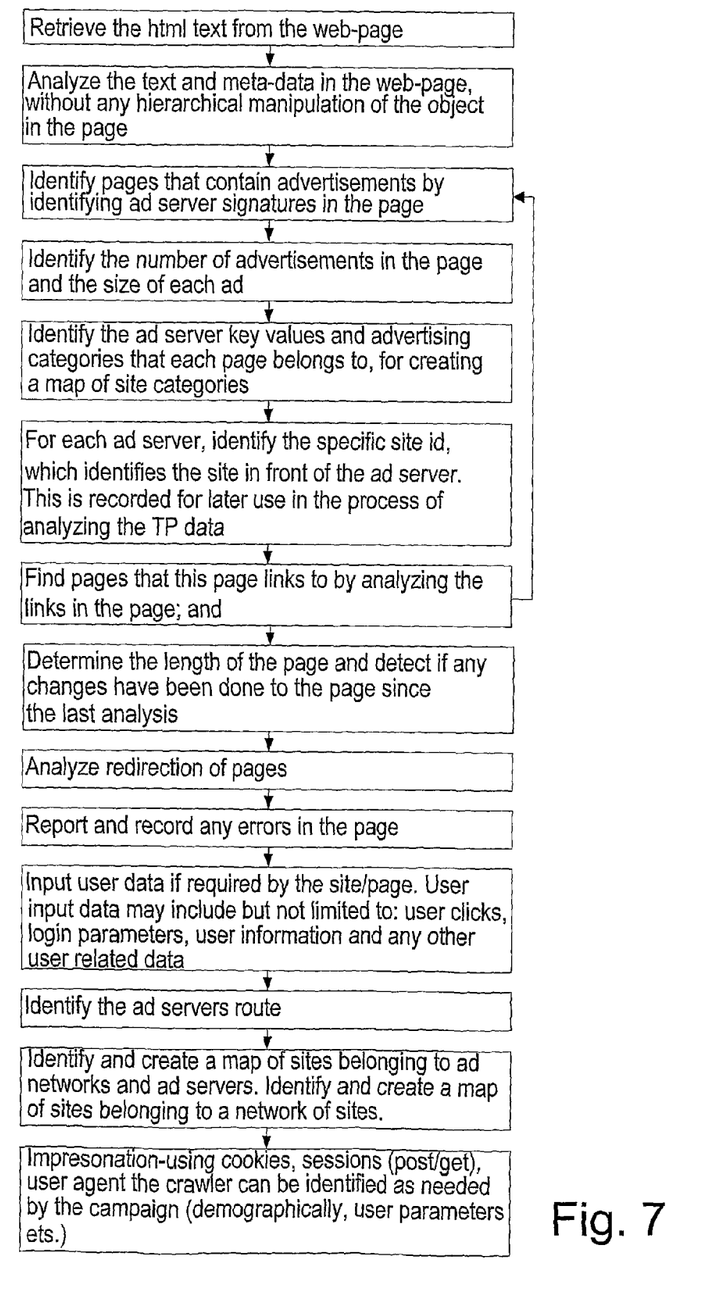

FIG. 7 shows a flow chart of a mapping crawler. The mapping crawlers are used to do the following:

Identify pages that contain advertisements by identifying ad server signatures in the page.

Use the identification of pages that contain advertisements by identifying ad server signatures in the page to identify the number of advertisements in the page and the size of each ad.

Use the identification of pages that contain advertisements by identifying ad server signatures in the page to identify the ad server key values and advertising categories that each page belongs to, so that a map of site categories can later be created.

Find pages that this page links to by analyzing the links in the page.

By using the found pages that the page containing advertisement links to, a site map can be created with the number of times each page is linked along with other parameters representing the weight of the page. Based on this weight, the pages to be crawled can later be selected.

Determine the length of the page and detect if any changes have been done to the page since last analyzing it.

The Visual Crawler

Visual crawling is a more complex method of crawling that renders the page graphically and generates a hierarchical representation of the page based on the html text of the page (similar to the web browsers). The visual crawler's operation is similar to a human visiting the page.

These visual crawlers are used to:
identify various media types that are displayed on the page such as:
images (jpg, gif, etc.);
flash animations;
streaming video;
text ads.

For each media type, it can:
track down its landing page (click through URL). This tracking may include several servers that the click goes through until it reaches its final destination
find its position on the page
find its dimensions (width×height)
check if its html/JavaScript tag has certain signatures that define the media as an advertisement. Those signatures may be derived from the ad servers.

The crawlers can identify all of the tags on the page that correspond to an ad server's signature. The tag is parsed and information such as the URL of the creative file, the landing page, the type of ad, the size of the ad, the advertising category and more parameters are extracted. This way, each tag identified by a crawler (mapping or visual) can be mapped, in order to identify the website from which this particular tag has been viewed.

Visual Crawling Methods

The visual crawler can employ various methods:

Session Crawling—a session is a unique ID that a visitor receives when the user visits a web site for the first time. This session ID follows the visitor through its visits on the web site pages until the user leaves the web site to another or closes the browser. Some advertising techniques are based on sessions, for example a surround session in which a user is served ads of the same advertiser through the user's entire session on the site, or a registered user login. In session crawling, the visual crawler simulates a user's session and tracks the delivery of advertisements within the session.

Cookie Crawling—a cookie is a unique ID that a web site can save on the visitors computer and read it, from the visitor's computer each time the visitors visits the site. Some advertising techniques are based on cookies, for example a registered user which has demographic data saved in its cookie and which is used for targeting, or behavioral targeting in which ads are served to the user based on sites and pages that the user visited in the past. In cookie crawling, the visual crawler simulates cookies and tracks the delivery of advertisements based on the cookies.

Contextual Crawling—in this method, the crawler identifies the context of the page. This is used for contextual targeting, in which ads are served based on the context of the text in the page.

Classification Crawler

Classification crawlers are similar to the mapping crawler. They retrieve the HTML text from the web page and analyze the text and meta-data in the page. The difference is in the analysis itself. The crawlers use different analysis techniques to analyze the web page and determine its different classifications.

The Crawlers Manager

The Crawlers manager server intermediates and arbitrates between the data repository and the various crawlers running all over the world. The crawlers manager knows the location and status of each of the crawlers, and by knowing the availability of each crawler and the crawling requirements, it decides how to distribute the crawling tasks.

Figure 8:
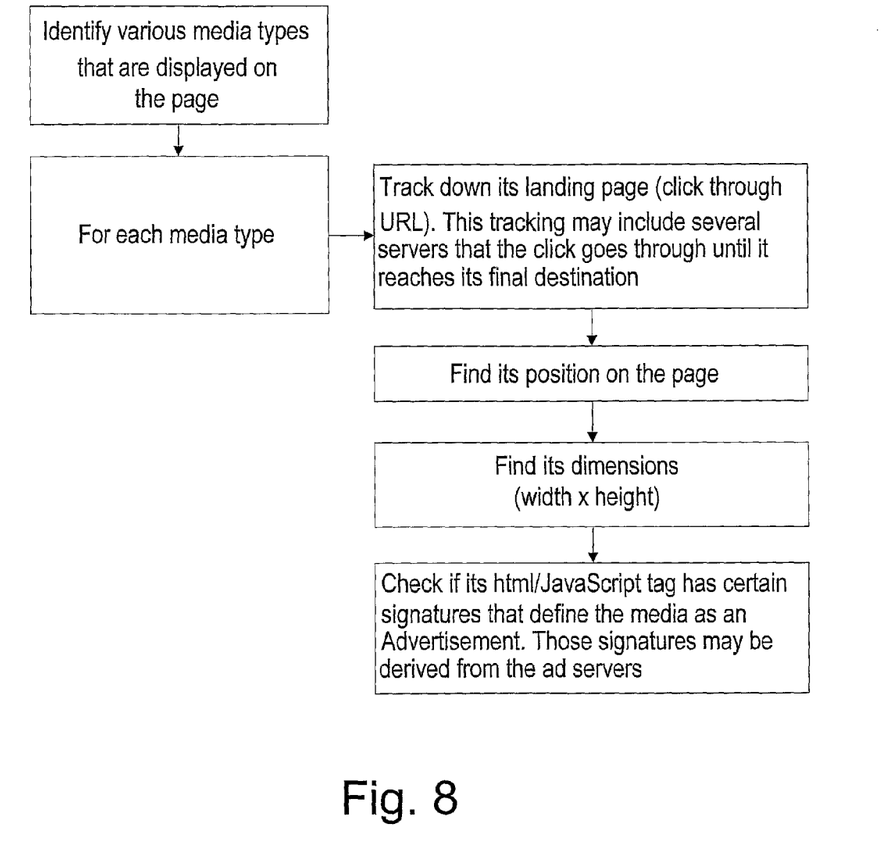

FIG. 8 shows the crawler manager common operations flow chart:

The crawlers manager is responsible for the following:
- Retrieves sites/pages that needed to be crawled form the data repository and allocates them to the various crawlers. Each crawling demand can include:
  - The URL address of the page to be crawled
  - When the crawling should be done
  - Geographical location of the crawl
  - How many times to visit the page by same person (cookies is one optional implementation).
  - What browser/computer/screen size to simulate
  - And more characteristics
- Updates the data repository with the page/site that were crawled and the crawl location
- Insert crawler crawling results into the data repository Crawler Implementations There are several methods in which the crawlers can be implemented, two of which are described below:
- Autonomous crawler—this crawler is an independent computer program. It is usually installed on dedicated crawling servers.
- Plug-in crawler—this crawler is implemented as an add-in or plug-in to various browsers such as Internet Explorer, Firefox, Opera, etc. This crawler works within the browser application and usually installed on many client computers such as in an audience panel and enables more distributive crawling. This can also be achieved by embedding an html/Javascript tag on the web page itself, either directly embedded in the page or indirectly served to the page through a third party computer program such as an ad server.

Advertisement and Advertiser Recognition

Advertisements are text/images/flash/video or other form of media that promote an advertiser's product. Very commonly, clicking on the advertisement will lead to a page with more information on the product that usually resides on the advertiser's website. This page is usually referred to as the landing page of the ad or click through URL. These advertisements are displayed on web pages, usually alongside the website's content.

Advertisements can be any piece of media on the page like: image, flash animation, text, streaming video and each day there a new ways to show ads on web pages as the technology grows and changes.

Figure 9:
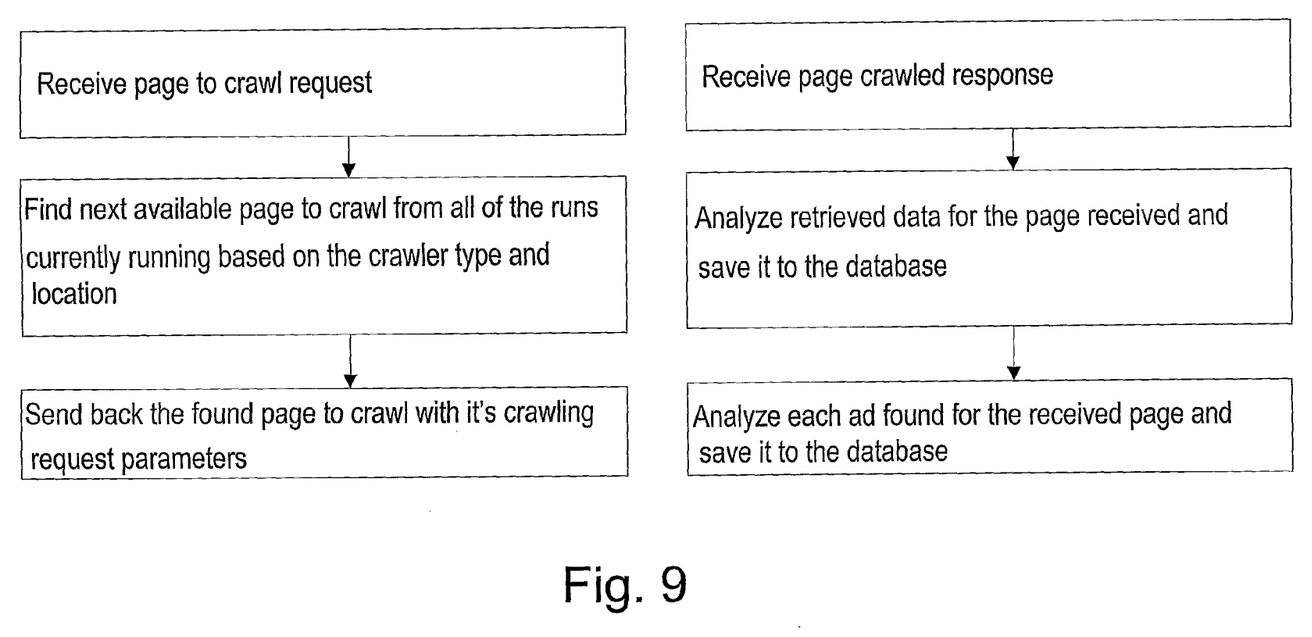

FIG. 9 shows advertisement/advertiser recognition flow chart. The advertisements can be in the web page in many different ways. Some of those ways are:
  Html tags (like image)
  Flash tags
  JavaScript
  IFrame that contains other ads inside Currently, most ads are served through commercial ad serving systems or ad networks such as DoubleClick, Google, Atlas, RightMedia and others, and some sites have their own internal ad serving systems. Those are all commonly referred to as ad servers.

Advertisement recognition can be implemented in various methods, one proposed method is:

1. Each ad server has a unique signature of the ad tag it uses for the different ads it serves, as well as a set of parameters that are included in the signature and that vary from ad serving system to another.

2. Identify all of the tags on the page that correspond to an ad server's signature (can be achieved on mass scale through a crawler as described above but through other methods as well).

3. Parse the tag and extract information such as the URL of the creative file, the landing page, the type of ad, the size of the ad, the advertising category and more.

Each site need to be identified by the ad server. This is commonly achieved by sending a parameter (id) to the ad server. The mapping process proposed by the present invention associates between each id and the viewed site. For example, if a particular site "A" is identified as site id 13 by ad server 1 and as site id 41 by ad server 2, etc, each time the tracking pixel identifies site id 13 that is served by ad server 1 or site id 41 that is served by ad server 2, it is known that site "A" has been viewed.

Sometimes the identification of the sites to the ad server is done by specifying in a certain parameter the actual name of the site. This data is delivered by the tracking pixel and then extracted to produce the origin URL. This technique allows to extract and translate the URL, even if it is within IFrame or nested IFrames. It also allows to trace back the route of ad servers the ad has passed thus identifying who delivered the ad to an inappropriate or undesired site.

Incidents Generation

An incident is any deviation, non-compliance or inconsistency between the terms and conditions of the insertion order and between the actual ad delivery. Incidents generation is done by analyzing the data retrieved from the crawlers (the delivery data) and the tracking pixel, and comparing it to the terms and conditions. When a mismatch is found between the definitions of the placements in the insertion orders (terms and conditions) and the actual delivery of the advertisements then an incident is created. Every incident can have a level of severance based on the extent of this incident happening and other configurable parameters The incident types are based on contractual agreements between the advertiser and the sites. Here are some examples of incidents types that can be generated based on certain contractual agreements:
  Below the fold incident: this incident occurs when the advertisement is shown below the fold of the page (so the user needs to scroll in order to see it). And the campaign doesn't allow below the fold advertisements shown. According to the method proposed by the present invention, this type of incident may be generated even without any information about an IO.

Competitive Collision: this incident occurs when the advertisement is shown with another advertisement of a competing advertiser on the same page. The competitor definition can come from the campaign definition or from a list of competitors for different advertisers.

Frequency incident: this incident occurs when the advertisement (for a specific advertiser) is shown too many times for a single repeat visitor within a specified timeframe. This frequency is defined in the campaign.

Multiple Ads: this incident occurs when the advertisement (for a specific advertiser) is shown with another advertisement of the same advertiser on the page, and it was not allowed by the campaign definitions.

Missing Geo Targeting: this incident occurs when the advertisement (for a specific advertiser) is shown to visitors located outside of a specified geographic region when the campaign didn't allow advertisements shown outside of that region.

Missing Targeting: this incident occurs when the advertisement is shown to visitors which are not in the target audience of visitors defined in the campaign. Some examples of this can include (but are not limited to) contextual targeting, behavioral targeting retargeting, demographic targeting and user-data targeting.

Placement not found: this incident occurs when the advertisement (for a specific advertiser) isn't shown on pages or sections that it was supposed to be seen as defined by the campaign, or when it doesn't start on time or ends before its time.

Sponsorship not enforced: this incident occurs when an advertisement is bought with a certain share of voice (meaning an ad is sold to appear once every certain number of visits to a page or a section, regardless of the number of visits), but in practice receives a different share of voice.

Wrong ad/creative—this incident occurs when an ad is served using the wrong creative (wrong picture/flash etc.) Long loading time—

Day time—this incident occurs when an advertisement is not served in the required time of day Out of channel—this incident occurs when an advertisement is served in the wrong channel (section of a site that is specifically targeted by the advertiser, e.g., finance section of a site)

Wrong dates—this incident occurs when an advertisement is not served in the required dates Ad clutter—this incident occurs when an advertisement is served in a page that contains a large number of ads (ad clutter). According to the method proposed by the present invention, this type of incident may be generated even without any information about an IO.

Ad fraud—this incident occurs when an advertisement is served together with other ads, but only one of the ads is actually displayed. According to the method proposed by the present invention, this type of incident may be generated even without any information about an IO.

Ad hijacking—this incident occurs when an advertisement is served to a site which then directs the ad to another site, however, identifies itself as the first site. In this situation the ad server registers the first site as the delivered site, while the actual site the ad has been delivered to is the latter site. According to the method proposed by the present invention, this type of incident may be generated even without any information about an IO.

Inappropriate content—this incident occurs when an ad is delivered on sites that contain inappropriate content. According to the method proposed by the present invention, this type of incident may be generated even without any information about an IO.

Out of inclusion sites—this incident occurs when an ad is delivered on sites that are not in the included sites list specified in the campaign IO.

Excluded sites—this incident occurs when an ad is delivered on sites that are in the excluded sites list specified in the campaign IO.

Incidents Scoring

Scoring is a way for a campaign manager/advertiser/site to know how well the advertisements are doing on the defined in the insertion order comparing the real results as opposed to the definitions in the campaign. The scoring is a number between 0 and 100. 0 is the lowest score possible and 100 is the best score possible (no incidents were generated).

Basic scoring can be done:
Per incident type per page.
Per incident type per page category.
Per site
Per incident type per site category.
More complex scoring can be done on aggregation of all incident types:
Per page
Per page category
Per site
Per site category Each incident type is scored individually so the campaign managers can have an idea of how well their insertion order is progressing. The scoring algorithm has to take into consideration the amount of incidents occurred and the number of advertisements found.

One simple possible scoring algorithm is as follows: Divide of the amount of incidents that occurred by the total number of advertisements found. A total incident scoring is one score for all of the incident types, giving a total score for the incidents (as described above). There are several algorithms to calculate incident scoring depending on how severe each incident type is against all other incident types.

Some examples of total scoring algorithms are:
Pick the worst three incident types and score them like: $(A*4+B*2+C)/7$ where A is the worst score and C is the third worst score.
Set priority for each incident type and calculate the median based on this priority multiplied by the incident type score.

Incidents Reporting

Incidents can be grouped by the different grouping options and given a score according to them.

The reports can be grouped by those grouping, and filtered by different parameters like:
Site
Page Category
Date
Incident type There are several kind of reports that can be created on incidents, some of them are:

Tearsheets reports—tearsheets are screen shots of pages with ads that adhere with the IO. After the incident generator processes a page and identifies no incidents, this page is reported as a tearsheet, as a proof of ad delivery process.

Summary reports—summarizes the incidents by the given filters and groupings. Then showing a score for each incident type or total incident type scores.

Progress Reports—summarizes the incidents by the given filters and groupings. Then show a score for each incident type or total incident type scores per day and show a progress of the scores through the insertion's order life According to some embodiments of the invention, the system can be implemented in digital electronic circuitry, or in computer hardware, firmware, software, or in combinations of them. Apparatus of the invention can be implemented in a computer or in a cellular phone program (software) product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output.

The invention can be implemented advantageously in one or more computer programs (software) that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform (software) a certain activity or bring about a certain result. A computer program (software) can be written in any form of programming language, (any kind of software that may be available in the future) including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random•access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer or cell phone keyboard, joystick or any other relevant device.

The invention can be implemented in a computer system that includes a back-end component, such as a data server, or that includes a middleware component, such as an application server or an Internet server, or that includes a front-end component, such as a client computer or cell phone having a graphical user interface or an Internet browser, or any other useful software application, or any combination of them. The components of the system can be connected by any form or medium of digital data communication such as a communication network. Examples of communication networks include, e.g., a LAN, a WAN, and the computers and networks forming the Internet and wireless network as well.

The computer system can include multimedia clients and servers. A client and server are generally remote from each other and typically interact through a network, such as the described one. The relationship of multimedia client and server arises by virtue of computer programs or any software running on the respective computers or any hardware and having a client-server relationship to each other.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A method for automatically monitoring and verifying worldwide compliance insertion orders of multimedia advertising content during a campaign, delivered over a data network, comprising:
  a) advertiser initiated uploading via said data network by means of a user interface or a software interface of a processor enabled device, of advertisement information according to a predetermined insertion order associated with campaign delivery requirements and a list of sites or of sections per site, to which the advertising content should or should not be provided according to said insertion order;
  b) activating a tracking pixel process for tracking web pages containing advertisement parameters;
  c) distributing, by means of least one crawler manager server to a plurality of web crawlers including at least one mapping crawler and at least one visual crawler, crawling tasks with respect to web pages that need to be crawled;
  d) activating, by means of said at least one crawler manager server, said plurality of web crawlers so that they will visit said tracked web pages and perform said crawling tasks, according to a predetermined site visiting plan, and will extract visual advertisement related delivery data, contextual delivery data, or metadata related delivery data therefrom;
  e) storing said extracted delivery data and data associate with said plurality of web crawlers in a plurality of databases; and;
  f) by means of at least one incident generator server, comparing said insertion orders with said extracted delivery data; and
  g) generating an incident whenever one of said insertion orders and its corresponding delivery data do not match, wherein said at least one visual crawler is used to render a web-page graphically and to generate a hierarchical representation of said page based on a HTML text of said page.

2. A method according to claim 1, wherein the tracking pixel process uses the delivery data for analysis and extraction of the URL of the visited site, in which the ad has been displayed.

3. A method according to claim 1, wherein the tracking pixel process uses the delivery data for detecting the tag of the displayed ad.

4. A method according to claim 1, wherein the tracking pixel process uses the delivery data for extracting path between ad servers, along which an ad passed until being displayed in a site.

5. A method according to claim 1, wherein the visiting plan includes how many times per day should each page be visited and the start and end date of the campaign.

6. A method according to claim 1, wherein the insertion order information is modified at any time point.

7. A method according to claim 1, wherein the at least one mapping crawler is used to identify ad server key values and advertising categories associated with each page for creating a map of site related to ad networks, ad servers, or a network of sites.

8. A method according to claim 7, wherein the site map includes the number of times each page is linked and parameters representing the weight of the page.

9. A method according to claim 1, wherein the at least one visual crawler is also used to identify interstitials.

10. A method according to claim 1, wherein the visual crawler performs:
Session Crawling;
Cookie Crawling;
Contextual Crawling; or
Classification Crawling.

11. A method according to claim 1, wherein the crawlers' manager is used to:
a) intermediate and arbitrate between the data repository and the running crawlers; and
b) retrieve sites or pages that needed to be crawled form the data repository and allocates them to different crawlers.

12. A method according to claim 1, wherein the crawler is an autonomous crawler or a plug-in crawler.

13. A method according to claim 1, wherein advertisements or advertisers are recognized according to:
HTML tags
Flash tags
JavaScript
IFrame that contains other ads inside.

14. A method according to claim 1, wherein advertisements are recognized by
a) Identifying all of the tags on the page that correspond to an ad server's signature; and
b) Parsing the tag and extract information such as the URL of the creative file, the landing page, the type of ad, the size of the ad and the advertising category.

15. A method according to claim 1, wherein the incident that is generated is selected from the group consisting of:
Competitive Collision incident;
a Frequency incident;
a Multiple Ad incident;
a Missing Targeting incident;
a Placement not found incident;
a Sponsorship not enforced incident;
a Wrong ad/creative incident;
a Day time incident;
an Out of channel incident;
a Wrong date incident;
an Out of inclusion sites site incident; and
an Excluded site incident.

16. A method according to claim 1, wherein the incident that is generated is a fold incident, an ad clutter incident, an ad fraud incident, an ad hijacking incident, or an inappropriate content incident.

17. A method according to claim 16, further comprising delivering the actual URL or site name by the tracking pixel and then extracting said URL or site name to produce the origin URL.

18. The method according to claim 1, wherein the at least one mapping crawler is used to
a) retrieve an HTML text from the web-page;
b) analyze the text and meta-data in said web-page, without any hierarchical manipulation of objects in the page;
c) identify pages that contain advertisements by identifying ad server signatures in the page;
d) identify the number of advertisements in the page and the size of each ad;
e) for each ad server, identify a specific site ID for identifying a site to the ad server so as to be recorded for later use in the process of analyzing tracking pixel data;
f) find pages that this page links to by analyzing the links in said page;
g) determine the length of the page and detect if any changes have been done to the page since the last analysis;
h) analyze redirection of pages;
i) report and record any errors in the page;
j) input user data if required by the site/page;
k) identify a route of an ad server: or
l) impersonate by using cookies so that the crawler can be identified as needed by a campaign.

19. The method according to claim 1, wherein the delivery data is generated by combining data collected by the tracking pixel process and by the plurality of web crawlers.

* * * * *